United States Patent [19]

Osborne et al.

[11] 4,171,527

[45] Oct. 16, 1979

[54] INK JET CONTAMINATION DETECTING SYSTEM

[75] Inventors: Edward T. Osborne; Danny A. Van Hook, both of Boulder, Colo.

[73] Assignee: International Business Machines Corporation, Armonk, N.Y.

[21] Appl. No.: 882,284

[22] Filed: Feb. 28, 1978

Related U.S. Application Data

[63] Continuation-in-part of Ser. No. 868,110, Jan. 9, 1978, abandoned.

[51] Int. Cl.[2] .............................. G01D 18/00

[52] U.S. Cl. .............................. 346/75

[58] Field of Search .............................. 346/75

[56] References Cited

U.S. PATENT DOCUMENTS

| | | | |
|---|---|---|---|
| 3,465,351 | 9/1969 | Keur | 346/75 |
| 3,852,768 | 12/1974 | Carmichael | 346/75 |
| 3,898,673 | 8/1975 | Haskell | 346/140 R |
| 3,911,445 | 10/1975 | Foster | 346/75 X |
| 4,063,253 | 12/1977 | Ito | 346/75 |

OTHER PUBLICATIONS

Burns, H. R.; "Automatic Ink jet Deflection Plate Cleaner;" IBM Tech. Disc. Bulletin; vol. 16, No. 9, Feb. 1974, pp. 3035-3036.

*Primary Examiner*—Joseph W. Hartary
*Attorney, Agent, or Firm*—John H. Holcombe

[57] ABSTRACT

Fouling of an electrostatic ink jet head is sensed and causes shutoff of the head and of the associated electronics. The fouling is sensed by detecting contamination of the charge electrodes or of the deflection plates by conductive ink, the detection being by sensitive circuitry employing diodes.

11 Claims, 6 Drawing Figures

INK JET CONTAMINATION DETECTING SYSTEM

This is a continuation-in-part of copending application Ser. No. 868,110, filed Jan. 9, 1978 now abandoned.

BACKGROUND OF THE INVENTION

1. Field of the Invention

The invention relates to ink jet and, more particularly, to ink jet systems employing conductive ink.

2. Description of the Prior Art

In recent years, substantial effort has been directed toward designing nonimpact printing systems potentially having relatively high resolution and relatively high printing speeds. Electrostatic ink jet is such a nonimpact printing system, and significant effort has been focused on achieving high resolution and achieving high speed.

High resolution requires fine nozzles and fine drop charging and deflection structures to form and control small drops. The inks usually employed in such systems are corrosive in nature as well as conductive. Thus, any partial clogging or fouling of a nozzle resulting in misdirection of the jet may ultimately cause substantial electrical shorting and cause corrosion of delicate parts.

A way of increasing the printing speed of ink jet systems is to employ multiple nozzles and multiple charge electrodes, all closely spaced with respect to one another. With large numbers of closely spaced and delicate electrodes and nozzles, the partial clogging or fouling of a single nozzle may cause damaging interactions with other nozzles and electrodes. Such potentially damaging interactions may result in destruction in the usefulness of an entire multi-nozzle ink jet head.

Prior efforts have concentrated on perfection of the ink jet nozzles, upon perfection of the ink's chemical composition, and upon perfection of ink filtration systems to thereby attempt to prevent any clogging or fouling of the ink jet nozzles. It may be that such perfection is not truly attainable in the machine production environment.

SUMMARY OF THE INVENTION

The present invention relates to an electrostatic ink jet head assembly, including at least one nozzle for projecting a stream of conductive ink, at least one corresponding charge electrode for charging drops formed from the stream, and deflection electrode means for deflecting charged drops from a normal path of uncharged drops in the stream. The present invention comprises sensing apparatus for detecting the impingement of sufficient conductive material at certain of the above electrodes to contaminate the electrodes, and apparatus responsive to the operation of the sensing apparatus to shut down affected parts of the assembly, for example, to shut off the ink jet head to prevent projection of the stream, and to shut off operation of the charge electrode and the deflection electrode means.

DESCRIPTION OF A PREFERRED EMBODIMENT

Figure 1:
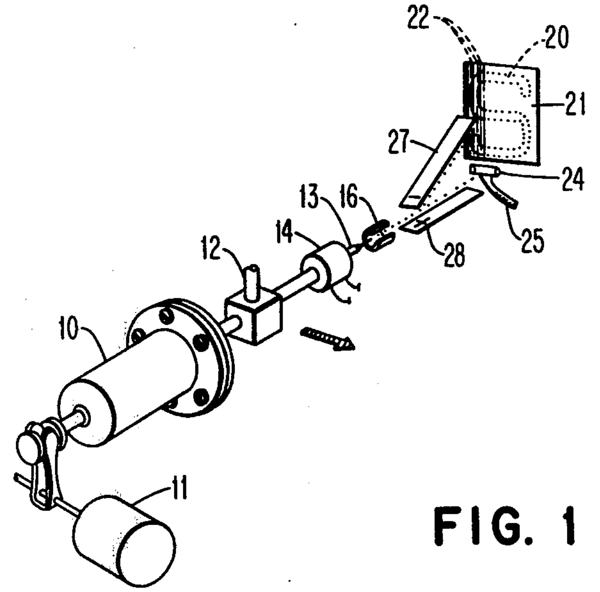
FIG. 1 PRIOR ART
FIG. 1 is an illustration of a single jet ink jet head assembly.

FIG. 1 illustrates an ink jet printing system and head assembly. This includes a pump 10 operated by motor 11 for directing ink from an ink supply conduit 12 to a single nozzle 13. The ink is directed through a crystal 14 which is pulsed at high frequencies, for example in the range of 117 kHz. The ink emitted from the nozzle 13 breaks into drops when passing through a charge electrode 16. The drops are thus variably charged thereat in accordance with the output of a charge amplifier in order to deflect the drops in a column an amount representing the vertical height of the drop locations in any given character.

As illustrated, the S designated as 20 to be printed on document 21 comprises a number of individual vertical columns 22. The printing is such that a sequence of vertical columns, each comprising a plurality of drops, is propelled from nozzle 13 toward the document 21 for the printing of the character involved. If drops are not required for printing, they are directed to a gutter 24 for passage by means of a conduit 25 back to the ink supply. Deflection plates 27 and 28 are positioned respectively above and below the path of travel of the drops leaving the charge electrode 16. A high voltage is applied to one of the plates and the other may be grounded or may have a high negative potential to thereby create a potential gradient therebetween. This, in cooperation with the variable charges on the individual drops, determines the amount of deflection of each drop as the drop is directed towards the document 21.

Specifically, the ink jet stream emitted from nozzle 13 is caused to have a perturbation therein which grows in accordance with the distance from the nozzle. This perturbation is the result of the vibration of the crystal 14. Within the confines of the charge electrode 16, the individual perturbations grow to the point that drops break from the stream. The charge imparted to an individual drop is dependent on the charge electrode at the moment of breakoff. The variable charging and constant deflection gradient between plates 27 and 28 cause characters to be formed by deflecting the variably charged drops to desired locations in a forty drop high raster or scan. Forty drops may represent a vertical distance of one-sixth of one inch, this forming a forty drop high character box for ten pitch characters.

Figure 2:
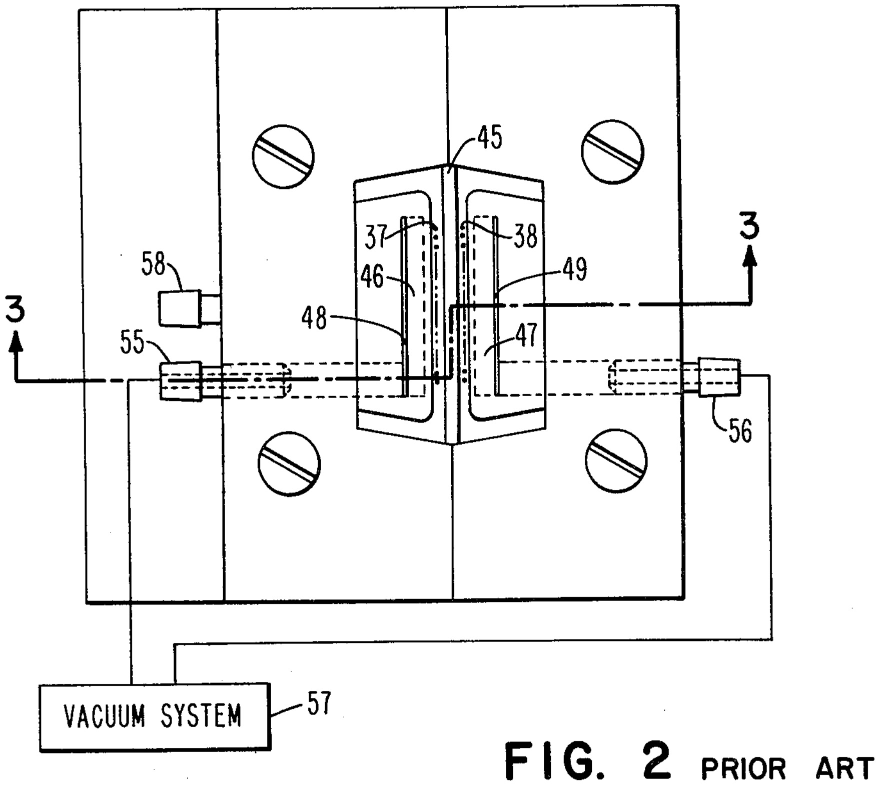
FIG. 2 PRIOR ART
FIG. 2 is a frontal view of a multi-jet ink jet head assembly.
Figure 3:
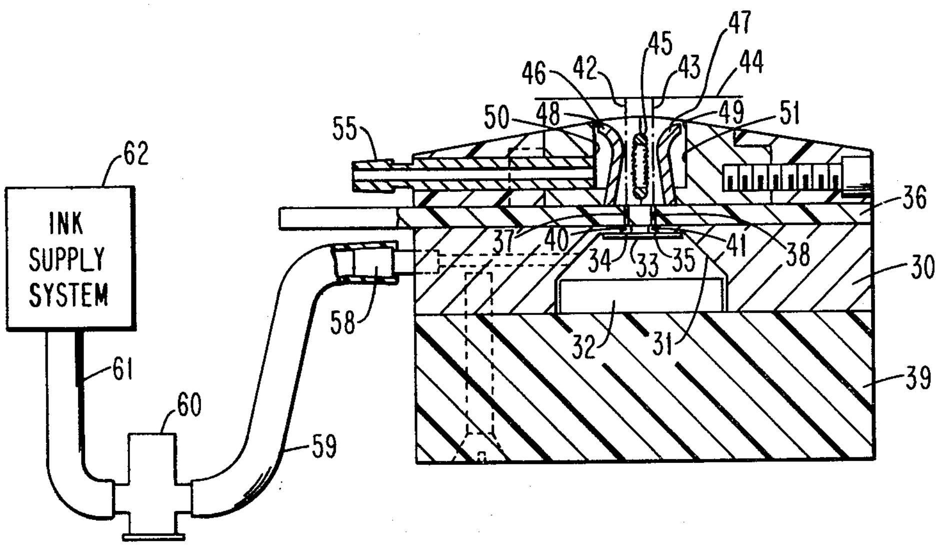
FIG. 3 PRIOR ART
FIG. 3 is a cross-section view through the ink jet head assembly of FIG. 2.

A multi-jet head assembly is illustrated in FIGS. 2 and 3. A block 30 includes a manifold 31 formed therein. Within the manifold are a piezoelectric crystal 32 and a nozzle orifice plate 33. The orifice includes two rows 34 and 35 of closely spaced ink jet orifices. A charge plate 36 is mounted on block 30 and is provided with two rows of charge electrodes 37 and 38, each charge electrode aligned with a corresponding orifice of orifice plate 33. The piezoelectric crystal 32 is mounted on a backing plate 39.

Pressurized ink is supplied to manifold 31 and is ejected through orifices 34 and 35 of orifice plate 33.

Piezoelectric crystal 32 is perturbated by an electrical signal to vary the internal volume of the manifold 31. This perturbates the ink pressure, causing the ink jet streams emanating from orifices 34 and 35 to break into streams of uniform drops. As described with respect to the stream of FIG. 1, the ink emanates from orifices 34 and 35 in the form of streams passing through openings 40 and 41 with the perturbations increasing as the distance from the orifice plate 33 increases. At a distance from the orifice plates such that the streams are within corresponding charge electrodes 37 and 38, the drops break off from the streams. The drops then assume a charge dependent upon the voltage applied to the corresponding charge electrodes 37 or 38 at the instant of drop breakoff.

Uncharged drops proceed along paths 42 and 43 to impact a recording medium 44. A deflection plate 45 is maintained at a high voltage and is positioned intermediate the drop flow paths 42 and 43. Deflection electrodes 46 and 47 are electrically grounded and are positioned respectively on the opposite sides of drop paths 42 and 43 from high voltage deflection electrode 45. As shown, deflection electrodes 46 and 47 may curve away from the drop paths and terminate in openings 48 and 49 which communicate with cavities 50 and 51. The cavities 50 and 51 may further communicate with tubes 55 and 56 which are connected to a vacuum source 57 for withdrawing ink therefrom for return to an ink supply.

Manifold 31 is further connected by means of channel 58 and hose 59 to a pump 60. The pump is further connected to a conduit 61 which is connected to the ink supply 62. Pump 60 thus is actuated to provide ink from the ink supply to manifold 31 to cause ejection of the ink through orifices 34 and 35 of orifice plate 33.

Figure 4:
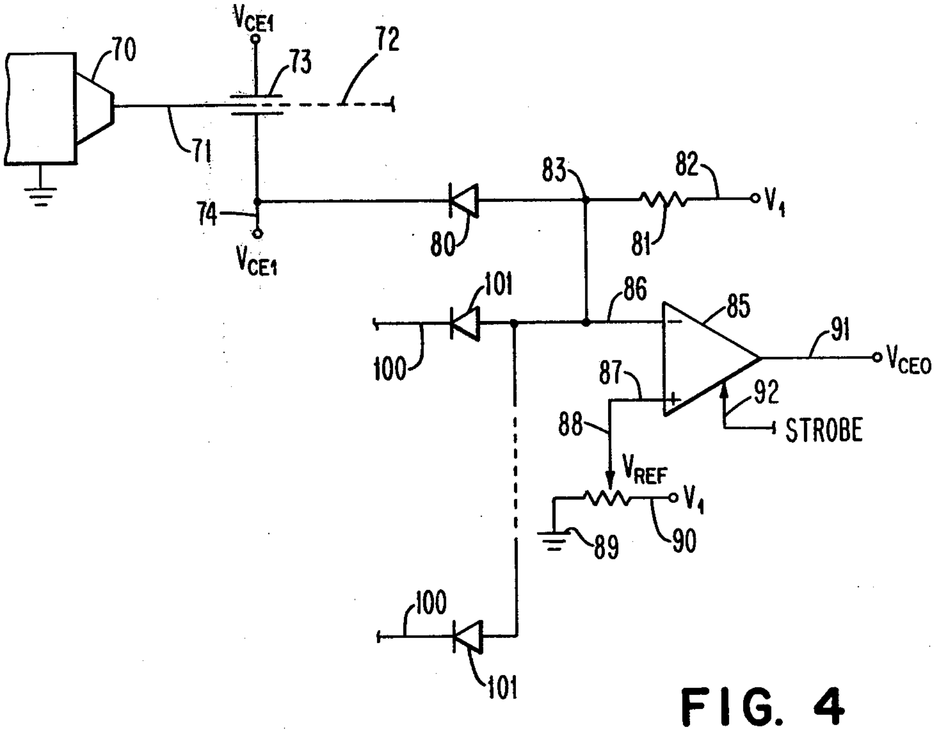
FIG. 4 is a schematic representation of a sensing means for use with the charge electrode of FIG. 1 and with multiple charge electrodes of FIGS. 2 and 3.

FIG. 4 illustrates the circuitry of the present invention for detecting the contamination of one or of a plurality of charge electrodes. Specifically, exemplary ink jet nozzle 70 emits ink jet stream 71 which breaks into a stream of ink jet droplets 72. Assuming the exemplary ink jet nozzle is that of FIG. 1, charge electrode 73 is the same as charge electrode 16 in FIG. 1. The voltage applied thereto at input 74 by a charge amplifier may assume any of a wide range of applied values, possibly reaching a peak value of 250 volts.

The circuitry of the present invention is designed to strobe one or a plurality of charge electrodes to detect the voltage which corresponds to a preselected applied voltage.

As arranged for a single charge electrode only, the detection circuitry of the present invention includes a diode 80 with the conduction direction towards the charge electrode if the charging voltages are positive, a resistance 81, and an input 82 to which is supplied a constant voltage, to establish the indicating voltage at node 83, which is indicative of contamination or lack of contamination of the charge electrode 73. To establish this voltage, the voltage at source 82 must be slightly less than the preselected voltage applied at input 74 to the charge electrode 73. The voltage at node 83 is detected by an operational amplifier comparator 85. Node 83 is connected to a first input 86 of the comparator 85. The other input 87 to the comparator is connected to a voltage biasing source 88. The biasing source 88 may be a potentiometer and is connected between ground 89 and a constant voltage input 90. The voltage at input 90 is the same as that at input 82. Thus, the reference voltage at input 87 is a somewhat lower voltage than is the input voltage at input terminal 82.

So long as resistor 81 is not conducting, the voltage at node 83 and at input 86 of the comparator is equal to the constant input voltage at input 82. So long as this voltage remains higher than the reference voltage at input 87, the comparator supplies a zero output. However, the applied voltage at input 74 to the charge electrode 73 is often at a voltage lower than the preselected voltage. This lower voltage causes diode 80 to conduct, drawing a current through resistor 81, and dropping voltage at node 83. Inasmuch as dropping the voltage at node 83 below the reference voltage applied at input 87 to the comparator causes the comparator to supply an output, the comparator is provided with another strobe input 92. The strobe input acts as a gate, serving to keep the output of comparator 85 on line 91 grounded until a signal is applied at the strobe input. So as to test for contamination of charge electrode 73 only when desired and when the preselected voltage is supplied at input 74, the strobe input 92 is normally off, and is only operated at the desired testing time.

In operation, various charging voltages are supplied by the charge amplifier at input 74 to the charge electrode 73. Whenever this voltage is less than that supplied as the constant voltage at input 82, a current is drawn via diode 80 across resistor 81. The current drawn is sufficient to create a voltage drop so that node 83 follows the voltage at the charge electrode 73. Diode 80 thus serves as a conducting path so long as the voltage at input 74 is less than the constant voltage applied at input 82. Whenever the applied voltage 74 is greater than that at input 82, diode 80 prevents conduction and the resultant current draw across resistor 81. Node 83 then becomes clamped at the value of the constant voltage at terminal 82. The voltage as traced by node 83 is blocked from providing an output on line 91 from the comparator due to the lack of an input at strobe input line 92.

To test the charge electrode, the preselected voltage is applied at input 74 to the charge electrode and the strobe input is applied to input 92 of the comparator 85. Should the charge electrode not be contaminated, no current is drawn by the charge electrode and the voltage thereat exceeds the constant input voltage in input 82. Thus, diode 80 blocks that higher voltage from node 83 and no current is drawn across resistor 81. The voltage of node 83 thus is the same as that at input 82 and is higher than the reference voltage at input 87 to the comparator. Therefore, although the strobe input 92 is operated, the comparator provides no output on line 91.

Should the charge electrode be contaminated, the conductive ink will create a conduction path to ground tending to reduce the resultant voltage at the charge electrode and draw a current through diode 80. This current causes a voltage drop to occur across resistor 81, reducing the voltage at node 83 and at input 86 to the comparator. Upon its voltage dropping below that of the reference voltage at input 87, the comparator provides an output on line 91 for the time period of the strobe 92. The signal on line 91 is an indication of contamination of the charge electrode 73.

From the above description, it is apparent that diode 80 is not absolutely necessary for operation of the system. Its functions are to save a possible back voltage from occurring between charge electrode input 74 and the constant voltage source 82; to allow use of relatively inexpensive op amps. The diode is necessary, however, when applying the circuitry of FIG. 4 to a multiplicity of charge electrodes to isolate the charge electrodes from one another for normal operation. The system as shown may equally be used with a plurality of ink jet heads such as illustrated in FIG. 1 or with the multiple charge electrodes associated with the single head of FIGS. 2 and 3.

As illustrated in FIG. 4, a plurality of lines 100 and diodes 101 are connected individually to each of the remaining charge electrodes and are connected in common to input 86 of the comparator 85. As the result of this arrangement, node 83 will tend to follow the lowest voltage on any of the charge electrodes, due to the current draw toward that voltage by the associated diode 80 or 101 across resistor 81. The diodes 80 and 101 therefore isolate the associated charge electrode from node 83 whenever the charge electrode voltage is higher than the node.

In operation, all charge electrodes are operated at the preselected voltage by the associated input from the voltage source on line 74. Strobe 92 is then operated. Should none of the charge electrodes be contaminated, all of the charge electrodes will have a voltage higher than that supplied at the constant voltage input 82. Diodes 80 and 101 prevent any current flow across resistor 81 so that voltage at node 83 is the same as that at input 82. As this voltage is greater than the reference voltage at input 87 to the comparator, the comparator provides no output signal on line 91.

Should any of the charge electrodes be contaminated, the conductive ink again forms a conductive link towards ground potential. This causes a current drain through the associated diode 80 or 101 through resistor 81. The resultant potential formed across resistor 81 drops the voltage at node 83. This voltage is then applied to input 86 of the comparator. Upon the voltage dropping below the reference voltage at input 87, comparator 85 will provide an output signal on line 91 so long as strobe input 92 is operated.

In summary, comparator 85 provides an output signal on line 91 only when both the strobe signal is supplied at line 92 and when one of the charge electrodes 73 is contaminated.

Figure 5:
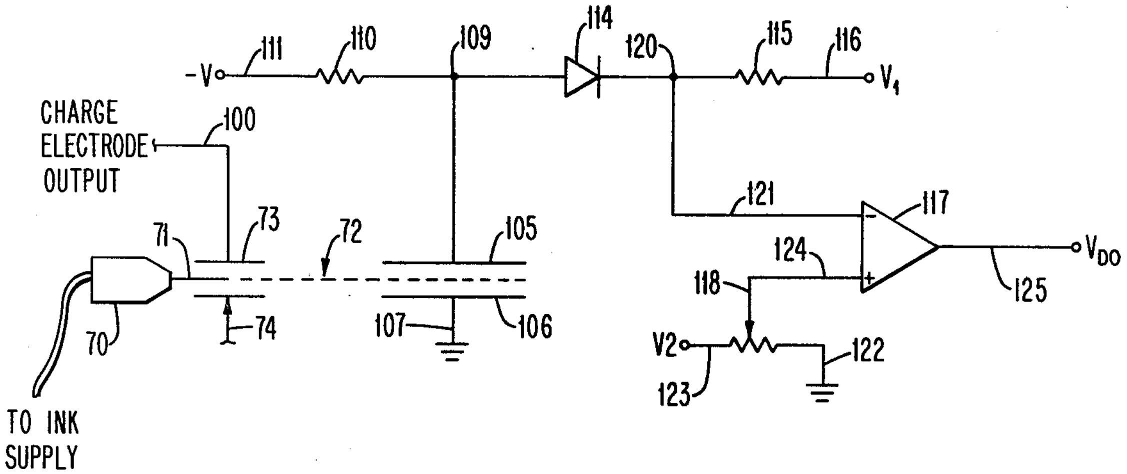
FIG. 5 is a schematic representation of a sensing means for use with the deflection electrodes of FIG. 1 or with the deflection electrodes of FIGS. 2 and 3.

With reference to FIG. 5, the circuitry employed to detect contamination of the deflection plates is somewhat similar to that employed with the charge electrode, although the voltages involved are considerably higher. Once again, an exemplary ink jet nozzle 70 is illustrated producing an ink stream 71 which is perturbated and breaks into a stream of drops of 72. Subsequent to the charge electrodes 73 and in the direction of the stream or streams 72 are located the deflection plates 105 and 106. Deflection plate 106 may be connected to a ground potential 107 or may be connected to a negative potential thereat. The deflection plate 106 thus corresponds to deflection plate 28 in FIG. 1 and to deflection plates 46 and 47 in FIGS. 2 and 3. Deflection plate 105 is connected, via node 109 and resistor 110 to input 111 of a high voltage supply. Deflection plate 105 thus corresponds to plate 27 in FIG. 1 and to electrode 45 in FIGS. 2 and 3.

In the example chosen, the drops are charged negatively by positive charge electrode input 74 and the high voltage supply is a constant high amplitude negative voltage. Precisely the opposite arrangement may also be used. Should the deflection plates be contaminated with conductive ink, a current might flow from deflection plate 105 towards ground or towards an available positive voltage. The current flow creates potential across resistor 110, raising the voltage at node 109 toward ground potential.

The detection circuitry includes diode 114, resistance 115, input 116 from a constant voltage source of lesser negative amplitude than the voltage supply input 111, comparator 117, and reference voltage source. The value of resistance 115 is selected to be significantly less than that of resistor 110. Thus any current flow through resistor 115 will be significantly greater than that through resistor 110, and thereby establishes a detection node 120 which is connected to input 121 of the comparator 117.

The reference voltage source 118 may comprise a potentiometer connected between ground 122 and input 123 from a voltage source. This voltage source is negative and may be the same as connected to input 116. The reference voltage source is connected to input 124 of the comparator. Thus, a threshold voltage is established at input 124 which is somewhat closer to ground potential than the voltage at input 116. So long as the signal at input 121 is of higher negative amplitude than the threshold input 124, comparator 117 provides no output on line 125. Should the voltage at node 120 approach ground due to current flow through resistor 115, so that its value is of lesser negative amplitude than the threshold voltage at input 124, comparator 117 supplies an output signal on line 125.

In operation, first assume that the deflection plates 105 and 106 are not contaminated, so that nil current flows from the high negative voltage supply 111 to the deflection plate. As no current is flowing through resistor 110, there is no voltage drop thereacross and node 109 assumes voltage of input 111. As this voltage is more negative than the voltage at input 116, diode 114 is back biased and does not conduct. With the diode not conducting, node 120 assumes the voltage at input 116 for application to input 121 of the comparator. As this voltage is more negative than the reference voltage applied from source 118 to input 124, comparator 117 provides no output on line 125.

Assuming, however, that the deflection plates become contaminated so as to draw a current through resistor 110, a potential is created thereacross to raise the voltage at node 109 toward ground potential. Upon the voltage at node 109 becoming more positive than the negative voltage at input 116, diode 114 becomes conducting. As a result, the current flow between input 116 and the deflection plate establishes a potential across resistor 115, creating a voltage at node 120, closely followed by the voltage at node 109 and plate 105. The voltage at node 120 is applied to input 121 at comparator 117. Upon this voltage being lesser than that from reference voltage source 118 as applied to input 124, comparator 117 supplies an output signal on line 125.

In summary, comparator 117 has as its comparison input the voltage at input 116 so long as the deflection plates are not contaminated. Upon the deflection plates becoming contaminated, the voltage at input 121 follows that of node 120 based upon current flow in resistance 115 and of deflection plate 105 so long as the voltage is closer to ground and of lower negative amplitude than that at input 116. Upon the voltage being less than the reference voltage, comparator 117 supplies the contamination output signal on line 125.

Additionally, a multiplicity of deflection plates could be attached and operated similarly to the charge electrodes.

Figure 6:
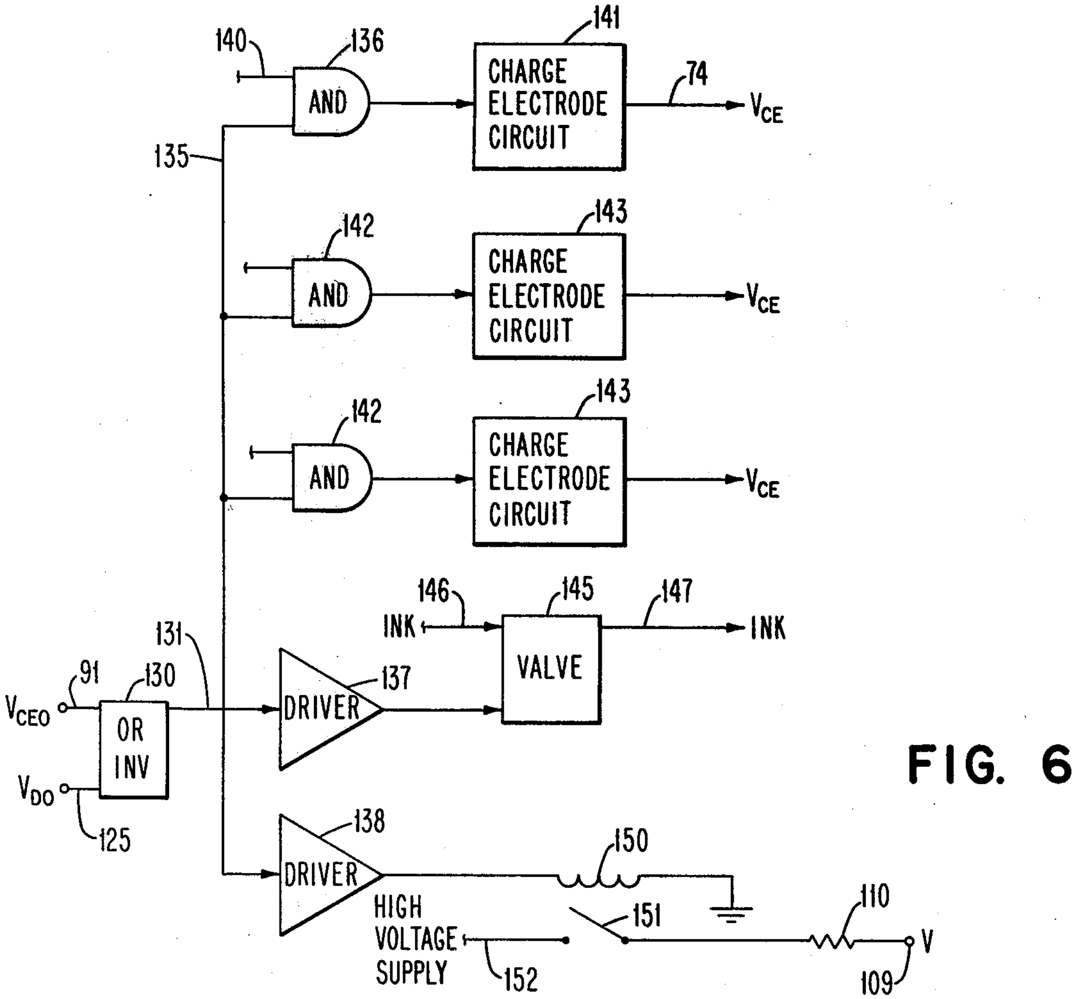
FIG. 6 is a schematic representation of the shutdown apparatus usable with the ink jet head assembly of FIG. 1 or with the ink jet head assembly of FIGS. 2 and 3.

Referring to FIG. 6, output line 91 from FIG. 4 and output line 125 from FIG. 5 are supplied as inputs to OR Invert circuit 130. OR Invert circuit 130 supplies an output signal so long as no input signal is supplied on either inputs 91 or 125. When a signal is received on either line 91 or on line 125, the OR Invert circuit 130 drops the output signal on line 131.

Output line 131 is connected to input 135 of AND circuit 136, to driver 137 and to driver 138. AND circuit 136 serves as a gate, with input 135 the controlling, or gating, input. Input 140 comprises the incoming charge electrode data. The data is normally transmitted by AND circuit 136 to a charge electrode circuit 141. The charge electrode 141 responds to the incoming data by supplying the charging signals on line 74 to the charge electrode 73 in FIG. 4. In the multiple nozzle environment, such as that of FIGS. 3 and 4, output line 131 of OR Invert circuit 130 is supplied to a plurality of AND circuits 136 and 142 to selectively gate data to a corresponding plurality of charge electrodes 141 through 143.

The driver 137 is connected to valve 145 in ink supply 146 and 147. The driver is arranged such that when no signal is present on output line 131, indicating that the charge electrodes or deflection plates are contaminated, the driver supplies no signal to valve 145 so the valve closes as the result of spring pressure. In normal operation, OR inverter 130 supplies an output signal on line 131, operating driver 137 to supply a signal to valve 145, holding the valve open to supply ink from input line 146 to output line 147. Output line 147 is connected to the ink jet head for the supply of ink thereto. For example, the supply line may comprise input 12 in FIG. 1 or may comprise a valve at the output of pump 60 in FIG. 3.

Similarly, driver 138 responds to the presence of a signal on line 131 by supplying a drive current to coil 150 of relay 151, thereby closing the relay point and connecting a high voltage supply 152 to resistance 110 and node 109 also illustrated in FIG. 5. Thus, the high voltage relay 151 comprises the voltage source at input 111 in FIG. 5 to supply the high voltage to the deflection plates 105 in FIG. 5. Should the deflection plates or charge electrodes become contaminated, OR Inverter 130 drops the output signal on line 131, in turn causing driver 138 to cease supplying a current through coil 150. High voltage relay 151 opens, terminating the high voltage supply to node 109 and to the deflection plate 105.

In summary, the lack of an input signal on inputs 91 or 125 OR Inverter 130 indicates that no contamination is present. The OR Inverter therefore supplies an output signal on line 131 gating the charging data via AND circuits 136 and 142 to the charge electrode circuit, operates driver 137 to open valve 145 to allow the flow of ink therethrough to the ink jet head, and operate drive 138 to close high voltage relay points 151 so as to supply the high voltage to the deflection plate. Upon either the charge electrodes or deflection plates becoming contaminated, a signal is supplied by the appropriate circuitry to either input 91 or input 125 of OR Inverter 130. Upon either or both inputs having a signal thereat, the OR Inverter 130 drops its output on line 131. Dropping that output causes AND gates 136 through 142 to block the supply of further charging data to the charge electrode circuits, therefore terminating the application of charging signal thereto. Dropping the signal on line 131 also causes drivers 137 and 138 to cease supplying signals to the corresponding valve 145 and high voltage relay 151, in turn, shutting off the ink supply through the valve 145 and terminating the high voltage supply from source 152 to the high voltage deflection plate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an electrostatic ink jet assembly having at least one nozzle means for projecting electrically conductive ink to form drops, charging electrode means for electrostatically charging said drops; and deflection electrode means for deflecting charged drops; the improvement for detecting contamination of any of said electrode means by said electrically conductive ink comprising:

means for establishing an electrical signal whose amplitude is related to the amplitude of an electrical current flow conducted by said contaminating electrically conductive ink at any of said electrode means; and signalling means for signalling the detection of said contamination upon said electrical signal exceeding a predetermined amplitude.

2. The improvement of claim 1 additionally including:

controlling means responsive to said detection signal from said signalling means for terminating operation of said ink jet assembly.

3. The apparatus of claim 2 wherein said nozzle means includes an ink supply means; wherein said charging means includes at least one charge electrode and at least one corresponding charge electrode circuit for applying charging signals to said charge electrode; and wherein said deflection means includes at least one deflection electrode to which a high electrical voltage is applied; and wherein said controlling means comprises:

valve means responsive to said detection signal from said signalling means for blocking ink supply means;

gating circuit means responsive to said detection signal for preventing said charge electrode circuit from applying charging signals to said charge electrode; and disconnect means responsive to said detection signal for terminating said application of said high voltage to said deflection electrode.

4. In an electrostatic ink jet assembly having at least one nozzle means for projecting electrically conductive ink to form drops, means for electrostatically charging said drops, and deflection means for deflecting charged drops; the improvement for detecting contamination of said deflection means by said electrically conductive ink comprising:

means for establishing an electrical signal whose amplitude is related to the amplitude of an electrical current flow conducted by said contaminating electrically conductive ink at said deflection means; and signalling means for signalling the detection of said contamination upon said electrical signal exceeding a predetermined amplitude.

5. The apparatus of claim 4:

wherein said deflection means includes at least one deflection electrode to which a high electrical voltage is applied; and additionally including controlling means responsive to said detection signal from said signalling means for terminating operation of said ink assembly including disconnect means responsive to said detection signal from said signalling means for terminating said application of said high voltage to said deflection electrode.

6. The improvement of claim 5 wherein said establishing means comprises:

means for providing a first electrical signal in response to an electrical current flow conducted by said contaminating electrically conductive ink; and means for providing a second electrical signal in response to said first electrical signal reaching a predetermined amplitude, the amplitude of said second electrical signal depending upon the amount of electrical current flow conducted by said contaminating electrically conductive ink, said second electrical signal thereby comprising said electrical signal of said establishing means.

7. The improvement of claim 6 wherein said means for providing a second electrical signal comprises:

a voltage source of a second predetermined amplitude;

a diode, interposed between said voltage source and said means for providing said first electrical signal, for providing a second electrical current to said deflection electrode means upon said first electrical signal reaching said second predetermined amplitude; and means for providing said second electrical signal in response to the amplitude of said second electrical current flow conducted by said contaminating electrically conductive ink.

8. In an electrostatic ink jet assembly having at least one nozzle means for projecting electrically conductive ink to form drops, and charging means for electrostatically charging said drops; the improvement for detecting contamination of said charging means by said electrically conductive ink comprising:

means for establishing an electrical signal whose amplitude is related to the amplitude of an electrical current flow conducted by said contaminating electrically conductive ink at said charging means; and signalling means for signalling the detection of said contamination upon said electrical signal exceeding a predetermined amplitude.

9. The apparatus of claim 8:

wherein said charging means includes at least one charge electrode, and at least one corresponding charge electrode circuit for applying charging signals to said charge electrode; and additionally including controlling means responsive to said detection signal from said signalling means for terminating operation of said ink jet assembly including gating circuit means responsive to said detection signal from said signalling means, for preventing said charge electrode circuit from applying charging signals to said charge electrode.

10. The improvement of claim 9 wherein said establishing means comprises:

a voltage source of a second predetermined amplitude;

means, interposed between said voltage source and said charge electrode, for providing a first electrical signal in response to an electric current flow to said charge electrode conducted by said contaminating electrically conductive ink, and to said charge electrode circuit upon the voltage thereof being of lesser amplitude than said voltage source; and said signalling means additionally comprises means for strobe sampling said first electrical signal at predetermined times, whereat said voltage of said charge electrode circuit is at least equal to that of said voltage source.

11. The apparatus of claim 8 wherein said ink jet assembly having at least two said nozzle means and at least two corresponding said charging means, said improvement additionally comprising:

isolation means connected to each said charging means for allowing said current flow of said establishing means and for preventing current flow from one said charging means to another said charging means.

* * * * *